United States Patent [19]

Seeker et al.

[11] Patent Number: 5,139,755
[45] Date of Patent: Aug. 18, 1992

[54] ADVANCED REBURNING FOR REDUCTION OF $NO_x$ EMISSIONS IN COMBUSTION SYSTEMS

[75] Inventors: William R. Seeker, San Clemente; Shih L. Chen; John C. Kramlich, both of Irvine, all of Calif.

[73] Assignee: Energy and Environmental Research Corporation, Irvine, Calif.

[21] Appl. No.: 674,752

[22] Filed: Mar. 22, 1991

Related U.S. Application Data

[63] Continuation-in-part of Ser. No. 598,879, Oct. 17, 1990, abandoned.

[51] Int. Cl.$^5$ .......................... C01B 21/00; B01J 8/00
[52] U.S. Cl. ........................................ 423/235; 423/239
[58] Field of Search .................. 423/235, 235 D, 239, 423/239 A

[56] References Cited

U.S. PATENT DOCUMENTS

4,851,201  7/1989  Heap et al. .......................... 423/235
4,861,567  8/1989  Heap et al. .......................... 423/235

Primary Examiner—Gregory A. Heller
Attorney, Agent, or Firm—Workman, Nydegger & Jensen

[57] ABSTRACT

Techniques for enhancing the burnout zone chemistry for $NO_x$ reduction are disclosed. The key parameters for the enhancement of burnout zone chemistry are: (a) a reaction temperature in the range from about 1300° F. to about 1900° F., and optimally in the range from 1400°–1700° F.; (b) a carbon monoxide concentration below about 0.5 percent; and (c) the presence of nitrogenous reducing species. By controlling the stoichiometry associated with reburning to produce a slightly fuel-rich region for selective reducing agent injection, reductions can be achieved at relatively low temperatures which approach those obtained by conventional catalytic reduction.

28 Claims, 11 Drawing Sheets

ADVANCED REBURNING FOR REDUCTION OF $NO_x$ EMISSIONS IN COMBUSTION SYSTEMS

RELATED APPLICATION

This application is a continuation-in-part of copending patent application Serial No. 07/598,879, filed Oct. 17, 1990, now abandoned, in the names of William Randall Seeker, Shih L. Chen and John C. Kramlich, and entitled "ADVANCED REBURNING FOR $NO_x$ CONTROL," which is incorporated herein by specific reference.

BACKGROUND

1. Field of the Invention

The present invention is directed to processes for control of $NO_x$ emissions. More particularly, the present invention is directed to improved reburning processes for reducing $NO_x$ emissions from combustion systems such as power plant boilers, process furnaces, and incinerators. By advanced air and fuel staging techniques, the present invention provides apparatus and methods for optimum conditions for the injection of selective reducing agents in the burnout zone and enhances the efficiency of reburning for $NO_x$ control.

2. Technology Review

Combustion of fossil fuels, especially coals and heavy oils, produces significant amount of $NO_x$ which ultimately participate in the formation of smog and acid rain. Combustion modification concepts including staged combustion and reburning have been effective in achieving up to 60 percent $NO_x$ reductions. Downstream injection of selective reducing agents, particularly ammonia ("$NH_3$") and urea ("$CO(NH_2)_2$"), can produce significant additional reductions. However, the temperature window over which these reagents are effective is relatively narrow.

Reburning is a $NO_x$ control process which uses fuel to reduce nitric oxide ("NO"). In the reburning process, a fraction of the fuel, between 10 and 20 percent of the total heat input, is injected above the main heat release zone to produce an oxygen deficient reburning zone. Hydrocarbon radicals from combustion of reburning fuel react with nitric oxide to form molecular nitrogen, thus reducing NO. This process occurs best in the absence of oxygen. Subsequently, burnout air is injected downstream to combust the remaining fuel fragments and convert the exiting HCN and $NH_3$ species to either NO or $N_2$.

Previous studies have shown that 60 percent reduction in $NO_x$ emissions can be achieved with natural gas reburning and that most of the reduction occurs in the reburning zone. $NO_x$ reduction in the burnout zone, via the HCN and $NH_3$ species from the reburning zone, is minimal because of the high burnout temperature (2200° F.–2400° F.) and the presence of excessive amount of carbon monoxide ("CO", above 2 percent at 0.9 stoichiometry).

In practice, $NO_x$ reduction by reburning is considerably less than the limits imposed by thermodynamics on NO formation under fuel-rich conditions. Examination of equilibrium levels of total fixed nitrogen species ($HCN + NH_3 + NO$) as a function of stoichiometry (SR) and temperature suggests that, except for high temperatures (greater than 3100° F.) and extremely fuel-rich conditions (SR<0.5), the equilibrium levels are less than 10 ppm. Equilibrium considerations would dictate operation of a combustor at moderate temperatures under fuelrich conditions, such as the reburning zone, or low temperatures near stoichiometric conditions.

From the foregoing, it is apparent that what is currently needed in the art are methods for optimizing reburning processes used to control $NO_x$ emissions from combustion systems.

Such methods are disclosed and claimed herein.

BRIEF SUMMARY AND OBJECTS OF THE INVENTION

The present invention discloses apparatus and methods to enhance the efficiency of reburning for $NO_x$ control. The present invention discloses a technique to enhance the burnout zone chemistry for $NO_x$ reduction.

Experimental results, discussed in greater detail below, suggest that the key parameters for the enhancement of burnout zone chemistry are: (a) a reaction temperature in the range from about 1300° F. to about 1900° F., and optimally at about 1400°–1700° F.; (b) a carbon monoxide concentration below about 0.5 percent; and (c) the presence of $NH_3$ species.

Conventional reburning processes do not provide a suitable environment for optimizing burnout zone chemistry. In a typical optimized process within the scope of the present invention, the burnout air is split into two streams. The first stream preferably remains at the normal injection location to reduce the CO concentration to below a level below about 0.5 percent and preferably below about 0.2 percent. A reducing agent capable of providing a source of $NH_3$ species is preferably added to the second stream of burnout air and injected downstream at a lower temperature, i.e. 1500° F., to complete the burnout.

Experimental results show little improvement over conventional reburning process when no $NH_3$ species were present at an $SR_3$ of 0.99. However, when a source of $NH_3$ species was added with the second stream of burnout air, an additional 50 percent reduction was dramatically achieved, resulting in an overall reduction of 85 percent in $NO_x$ emissions.

Suitable reducing agents which may be added to the second stream of burnout air within the scope of the present invention include an aqueous ammonium sulfate solution, cyanuric acid, urea, ammonia gas, aqueous ammonium solution, ammonium formate, aqueous ammonium formate, ammonium carbonate, aqueous ammonium carbonate, ammonium bicarbonate, aqueous ammonium bicarbonate, ammonium sulfate, and aqueous ammonium sulfate. The results have also shown that the addition of reducing agents in the reburning zone does not promote the formation of molecular nitrogen. However, the addition of reducing agents, such as ammonium sulfate, in the burnout zone can significantly enhance the conversion of XN species to $N_2$ and result in greater than 80 percent overall reduction in $NO_x$ emissions. The efficiency of the reducing agent appears to be dependent upon the local stoichiometry and temperature.

It is, therefore, an object of the present invention to provide methods for optimizing reburning processes used to control $NO_x$ emissions from combustion systems. Other objects and advantages of the invention will be set forth in the description which follows and in part will be obvious from the description, or may be learned by the practice of the invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings.

DETAILED DESCRIPTION OF THE PREFERRED EMBODIMENTS

Figure 1:
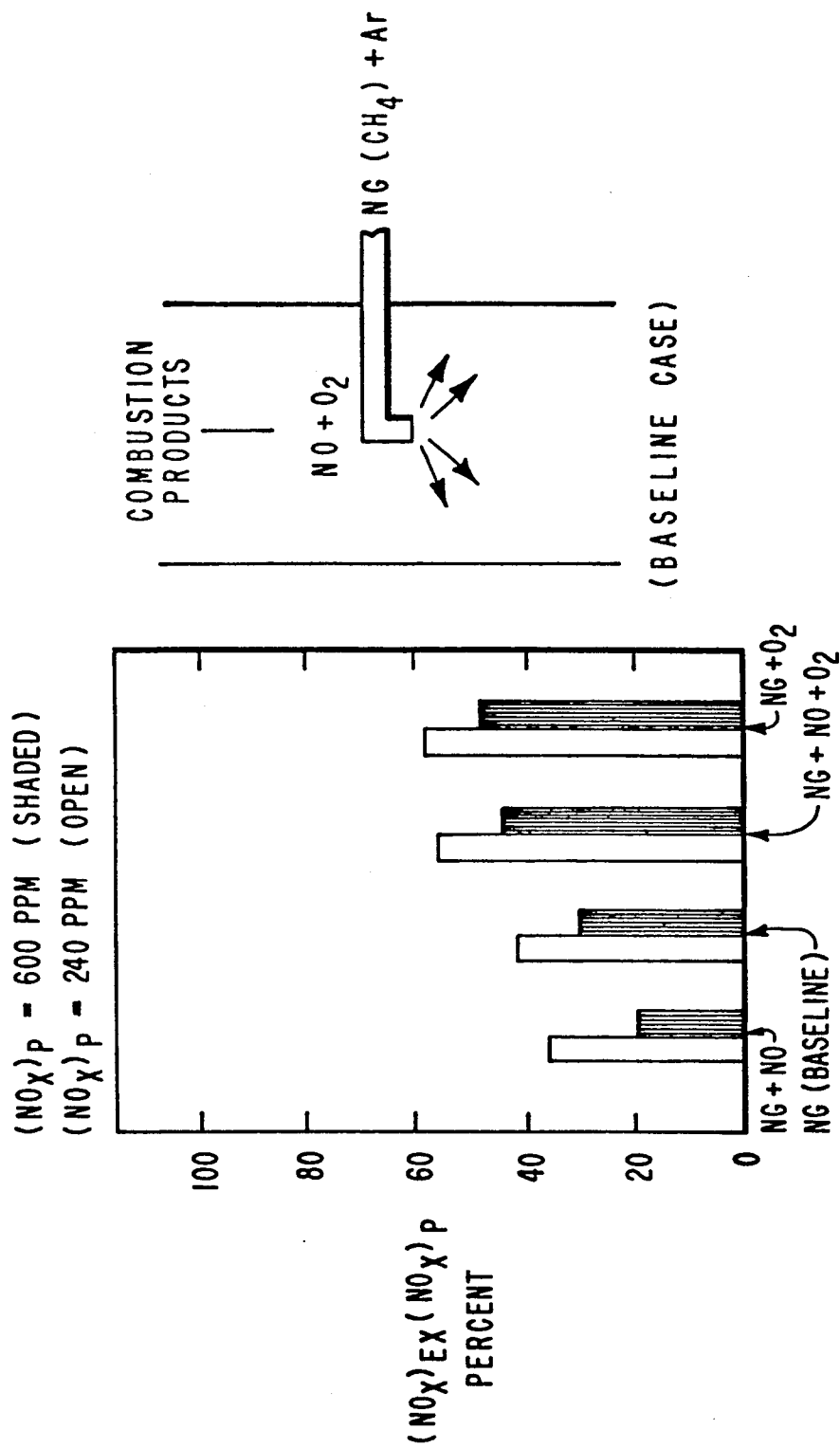
FIG. 1 graphically illustrates experimental tests to determine the competition between primary $NO_x$ and oxygen for hydrocarbon radicals.

Current combustion modification processes, such as staged combustion and reburning, have been effective in achieving up to 60 percent $NO_x$ reductions, far less than that predicted by equilibrium considerations. A study was undertaken to investigate and define the chemical constraints which prevent higher $NO_x$ reductions by reburning.

Tests were conducted to examine the formation of $N_2$ in the reburning zone and the conversion of XN species (NO, $NH_3$ and HCN) to NO and $N_2$ in the burnout zone. Detailed measurements were performed at the reburning zone exit to characterize unburned hydrocarbons, CO, NO, $NH_3$, and HCN. The influence of the concentrations of reactive species and temperature effects for both the reburning and burnout zone were examined.

The experimental results, described below, suggest that a hybrid $NO_x$ control scheme, which uses combustion modification to provide those conditions which optimize a selective $NO_x$ reduction process, can achieve very low $NO_x$ emission levels that can presently only be achieved by catalytic reduction.

The advanced reburning process within the scope of the present invention combines reburning with selective $NO_x$ reduction (SNR). In a typical advanced reburning process within the scope of the present invention, the burnout air is split into two streams. The first stream preferably remains at the normal injection location to reduce the CO concentration to below a level below about 0.5 percent. A reducing agent capable of providing a source of $NH_3$ species, such as ammonium sulfate, is preferably added to the second stream of burnout air and injected downstream at a lower temperature, i.e. 1500° F., to complete the burnout. Using this basic process, $NO_x$ reductions of approximately 85 percent have been obtained.

Bench scale tests were conducted using two different 25 kW tunnel furnaces. Furnace "A" was a 2.5 meter long, 20.3 centimeter diameter refractory-lined Control Temperature Tower (CTT). The time/temperature profile was adjusted using backfired heating channels within refractory walls. The primary fuel, natural gas, was fired at 17.6 kW using a premixed burner.

Furnace "B" was a 2.4 meter long, 15.2 centimeter diameter refractory lined tunnel furnace. The temperature was declining at a rate of 225.C/second throughout the region of interest. The primary fuel, natural gas, was fired at 15 kW using a premixed burner. The oxidant was air, and ammonia was added to the natural gas to provide the desired level of postflame NO. The NO values, along with all other concentrations, are reported on a dry basis, corrected for dilution to 0.0 percent $O_2$.

When the furnaces were operated to simulate staged combustion, the gases from the first stage, normally fuel-rich, were mixed with burnout air via a radial injector positioned on the furnace axis. The temperatures reported for the staging location are those of the furnace gas immediately after the staging air has been added and mixed. When the furnace was operated to simulate reburning, the reburning fuels were injected with a 90° injector located at the centerline of the furnace. This injector allowed the reburning fuel, diluted/transported with argon, to flow radially outward through four 0.5 cm holes and mix rapidly with the oncoming primary effluent. Burnout air was also injected radially.

Exhaust gas samples were withdrawn through a stainless steel, water-jacketed probe and analyzed for $NO_x$ (chemiluminescence, $O_2$ (paramagnetic), $CO/CO_2$ (NDIR), and $SO_2$ (NDUV). A water-jacketed probe with an internal water quench spray near the front end was used for extracting in-flame samples. Gas phase HCN and $NH_3$ species were collected in a gas washing unit and subsequently analyzed for CN and dissolved ammonia using specific ion electrodes. Gas temperatures were characterized with a suction pyrometer.

Pilot-scale experiments were conducted using a 3.0 MW, down-fired tower furnace. The furnace was refractory-lined and water-jacketed with inside dimensions of 1.2 meter × 1.2 meter × 8.0 meter. The four main diffusion burners each consisted of an inner pipe for axial primary fuel injection and an outer pipe, equipped with swirl vanes, for the main combustion air. This four burner array produced relatively uniform velocity and composition profiles at the primary zone exit. The furnace contained seven rows of ports for reburning fuel and burnout air injection. The temperature profile was manipulated by insertion of cooling panels, positioned against the furnace walls. The reburning fuel and burnout air injectors were designed to maintain jet mixing similarity between the pilot-scale furnace and a full scale boiler based on empirical correlations for entrainment rate and jet penetration.

Baseline conditions for the bench scale experiments were as follows:

Primary fuel/natural gas at $80 \times 10^3$ Btu/hour; primary $NO_X$ ("$(NO_X)_P$")=240 ppm or 600 ppm (dry, 0 percent $O_2$) by doping with NO; $SR_1$ (primary zone stoichiometry) =1.1.

Reburning gas injection at 2550° F. ($T_1$); reburning zone residence time ($\tau_2$)=400 ms; $SR_2$ (reburning zone stoichiometry) =0.9.

Burnout air injection at 2300° F. ($T_2$); $SR_3$ (burnout zone stoichiometry) =1.25.

The experiments examined (1) the formation of $N_2$ in the reburning zone, in particular, the availability of CH radicals, (2) the chemistry of XN conversion in the burnout zone, and (3) performance under the optimum reburning and burnout zone conditions.

1. $N_2$ Formation in the Reburning Zone

Upon injection to the furnace, the reburning fuel decomposes to CH radicals:

$$CH_4 + OH \rightarrow \ldots \rightarrow CH + H_2O \quad (1)$$

These radicals can then react with NO to form HCN:

$$CH + NO \rightarrow HCN + O \quad (2)$$

The HCN decays through $NCO \rightarrow NH_2 \rightarrow N$ and ultimately reaches $N_2$ via the reverse Zeldovich reaction:

$$N + NO \rightarrow N_2 + O \quad (3)$$

Reaction of primary NO species with CH radicals (equation (2) above) activates the reburning process. Thus, a goal in reburning optimization is to maximize the exposure of NO to CH and minimize CH interaction with oxygen via:

$$CH + O \rightarrow CO + H \quad (4)$$

To investigate reactant contacting, tests were run with oxygen and/or NO species, which were usually present in the primary zone effluent, premixed with the reburning natural gas prior to furnace injection. The results are shown in FIG. 1. With preferential contacting between the reburning gas and NO, exhaust $NO_X$ emissions were lower than the baseline case. When oxygen was premixed with the reburning fuel, a substantial increase in $NO_X$ emissions was witnessed, regardless of whether $NO_X$ was premixed with the gases. Higher primary $NO_X$ concentrations resulted in increased reduction in all cases. The results, which demonstrated the competition between primary $NO_X$ and oxygen species for hydrocarbon radicals, showed that $NO_X$—CH contacting was not rate limiting.

The presence of CH radicals is necessary for the reburning process to proceed. An approach to improve CH availability is to use a reburning fuel which favors CH as a decomposition product. Several gaseous hydrocarbon fuels were tested to investigate CH generation. The fuels included acetylene, ethylene (an olefin), isobutane (a paraffin), and natural gas, which was primarily methane. The fuels had an H/C ratio of one to four. The decomposition chemistry of these fuels is illustrated in FIG. 2.

Figure 2:
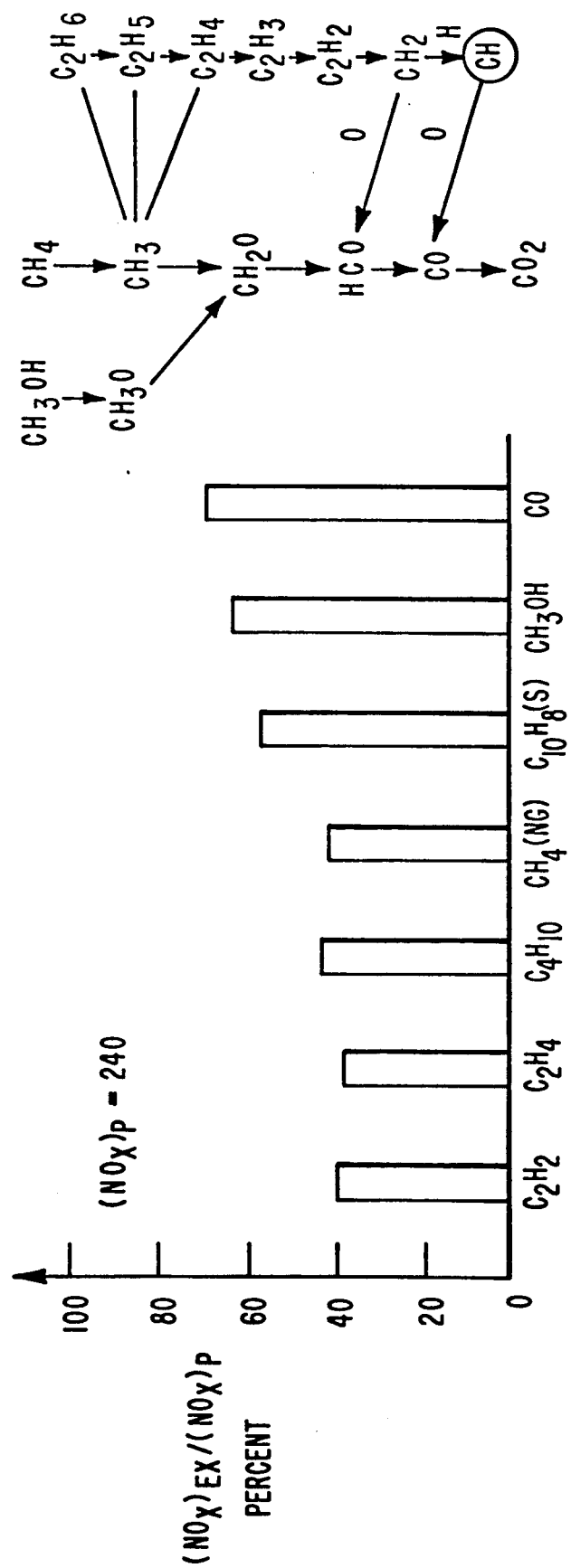
FIG. 2 illustrates the influence of reburning fuel composition on $NO_x$ reduction and the decomposition chemistry for various reburning fuels.

The experimental results, also presented in FIG. 2, indicate the reduction efficiency with all of the fuels was similar. Acetylene, the closest stable hydrocarbon to CH (as illustrated in the decomposition chemistry), did not appear superior to natural gas as a reburning fuel.

Another method to improve interaction between NO and CH is to slow the rate of reburning fuel oxidation. A solid hydrocarbon fuel, naphthalene ($C_{10}H_8$), was selected and tested as the reburning fuel. Lower reduction efficiency was obtained with this solid fuel. FIG. 2 also shows results obtained with methanol as the reburning fuel. Methanol, which favors CO as a decomposition product, yielded substantially lower reduction efficiency. As expected, reburning with CO resulted in $NO_X$ emissions.

Not only can HCN be formed via CH reaction with NO, equation (2) above, but HCN may be formed by the reaction between CH and molecular nitrogen; i.e., the Fenimore mechanism:

$$CH + N_2 \rightarrow HCN + N \quad (5)$$

The nitrogen which contributes to the Fenimore mechanism could come from primary combustion air, burnout air, or reburning fuel diluent. This mechanism, which causes the formation of thermal $NO_X$, occurs most readily at high temperatures. Tests were completed with nitrogen dilution of the reburning gas and a nitrogen-free primary zone oxidant composed of argon, oxygen, and carbon dioxide. The data (not shown) indicated that the primary zone nitrogen did not contribute to the Fenimore mechanism in the reburning zone. A slight increase in $NO_X$ emissions was observed when the argon diluent was replaced by nitrogen. The results implied that the Fenimore mechanism was not important in the reburning process.

Figure 3:
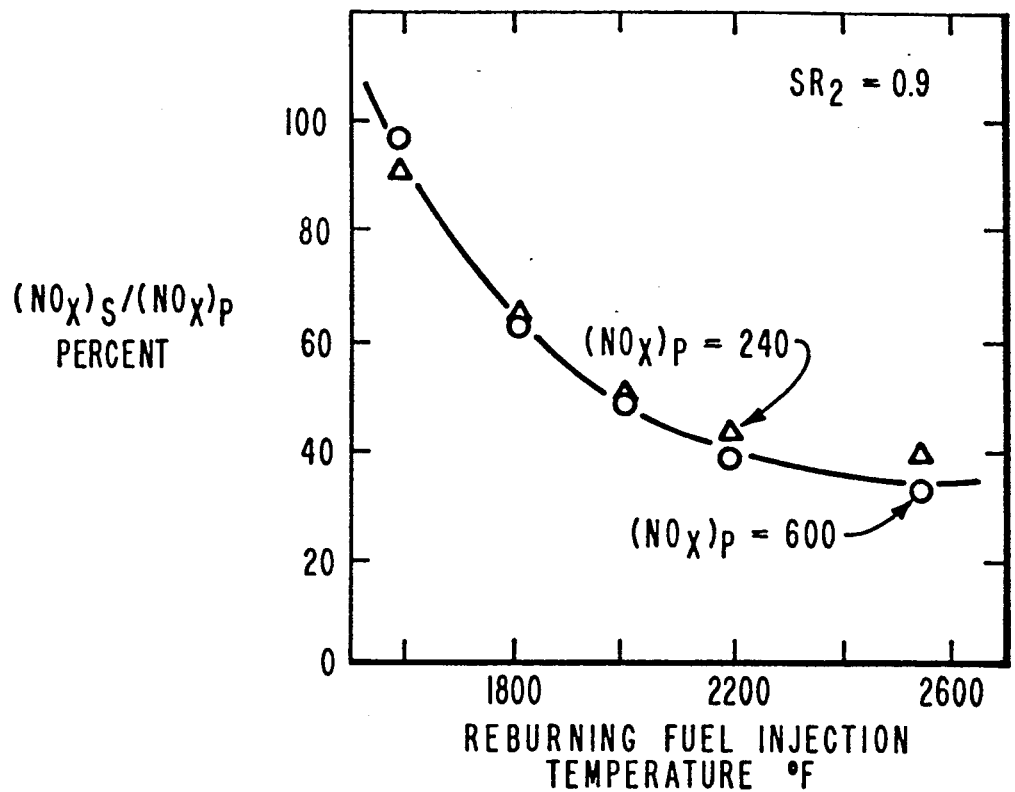
FIG. 3 illustrates the results of a series of experiments carried out to investigate the influence of reburning fuel temperature on NO reduction.

The results discussed above were obtained with the reburning fuel injected at 2550° F. A series of experiments was carried out to investigate the influence of temperature on fuel-rich zone NO reduction. The reburning fuel was injected at temperatures ranging from 2550° F. to 1600° F. the optimum stoichiometry of 0.9, the concentrations of NO were measured at 400 msec (milliseconds) downstream of the reburning fuel injection location. FIG. 3 presents these data and indicates that the NO reduction efficiency in the reburning zone decreased with temperature, with NO concentration measured at 2550° F. approximately half of that seen at 1800° F. However, the effect of temperature diminished when the reburning fuel was injected above 2200° F. It is believed that the formation of thermal NO would become important at temperatures above 2600° F.

2 XN Conversion in the Burnout Zone

The burnout zone can be considered as an excess-air "flame" burning the remaining fuel fragments from the reburning zone. Oxidation of the fuel fragments, particularly CO, could generate a significant amount of radicals via chain branching:

$$CO + OH = CO_2 + H \tag{6}$$

$$H + O_2 = OH + O \tag{7}$$

$$O + H_2O = OH + OH \tag{8}$$

These radicals play an important role on the conversion of XN species (e.g., NO, HCN, and $NH_3$) to $N_2$ or NO during burnout.

Figure 4:
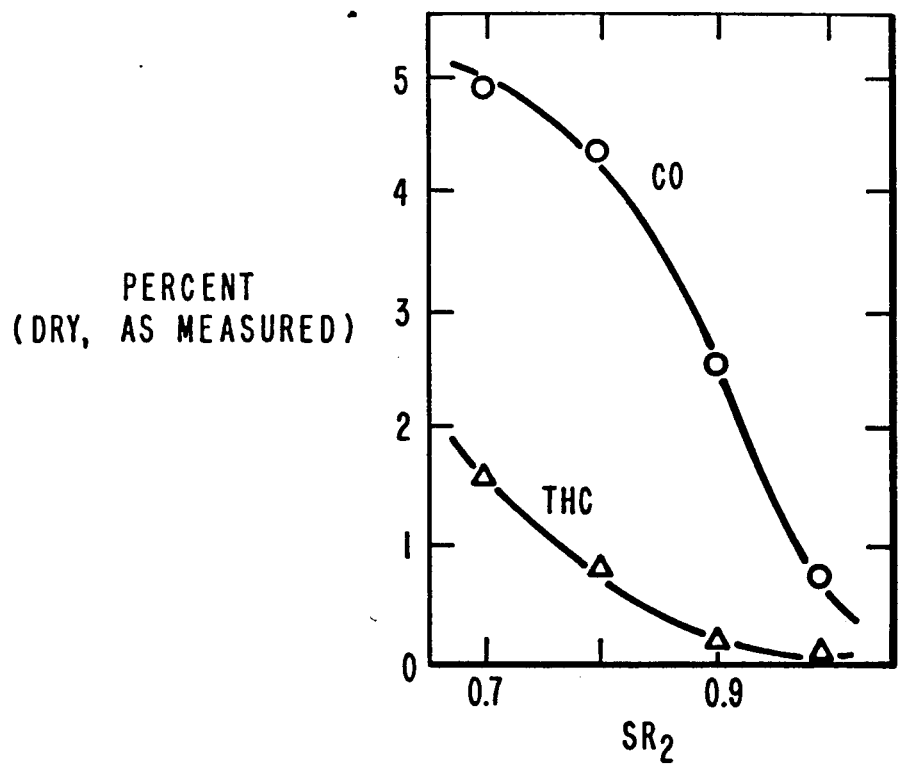
FIG. 4 illustrates CO and total hydrocarbon (THC) concentrations at the reburning zone exit as a function of stoichiometry ($SR_2$) within the reburning zone.

The fuel fragments were characterized initially. CO and total hydrocarbon (THC) concentrations at the reburning zone exit are presented in FIG. 4 as a function of reburning zone stoichiometry ($SR_2$). It can be seen that the amount of CO was considerably higher than THC at all stoichiometries, indicating extensive destruction of the natural gas CH constituents.

Figure 5:
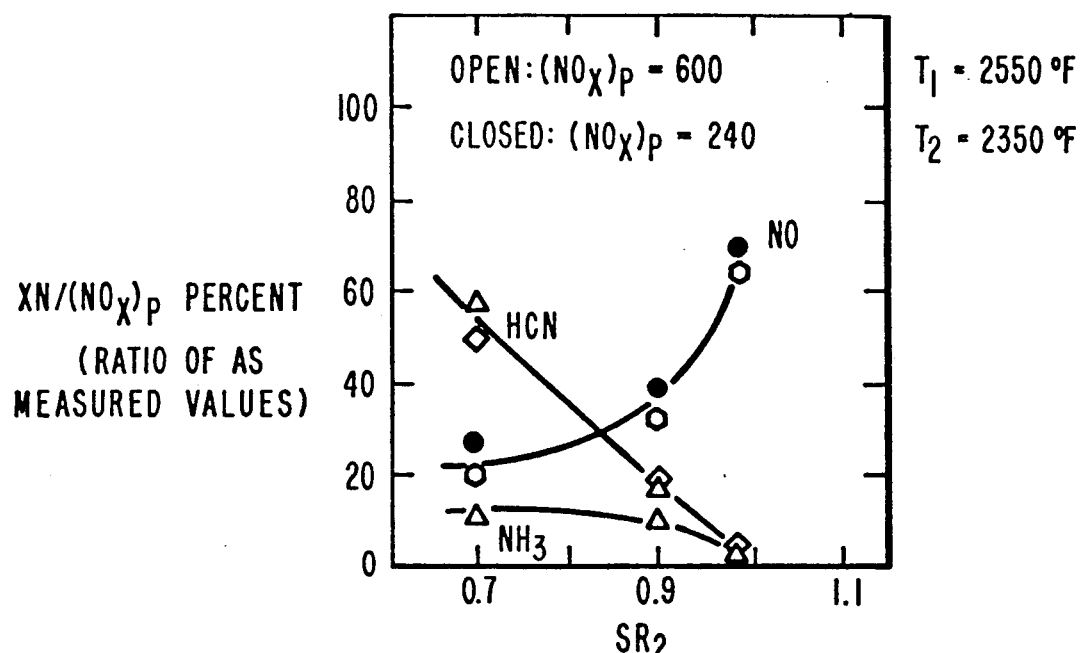
FIG. 5 illustrates the XN speciation at the reburning zone exit as a function of temperature.

XN speciation at the reburning zone exit was subsequently characterized and shown in FIG. 5. The concentration of NO decreased with stoichiometry, while the concentrations of intermediate species rose. When reburning zone stoichiometry ($SR_2$) was decreased from 0.9 to 0.7 to form a more fuel-rich environment, the amount of HCN arose dramatically, while $NH_3$ levels exhibited little change. This is an indication of a lack of oxidizing radicals available at richer stoichiometries for processing HCN through NCO to $NH_3$. Primary $NO_X$ concentration (600 ppm or 240 ppm) had only a minor impact on the percent conversion of NO to nitrogenous intermediates. At a reburning zone stoichiometry of 0.9, the ratio of $NH_3$ plus HCN to NO was approximately 0.9 for both cases.

Figure 6:
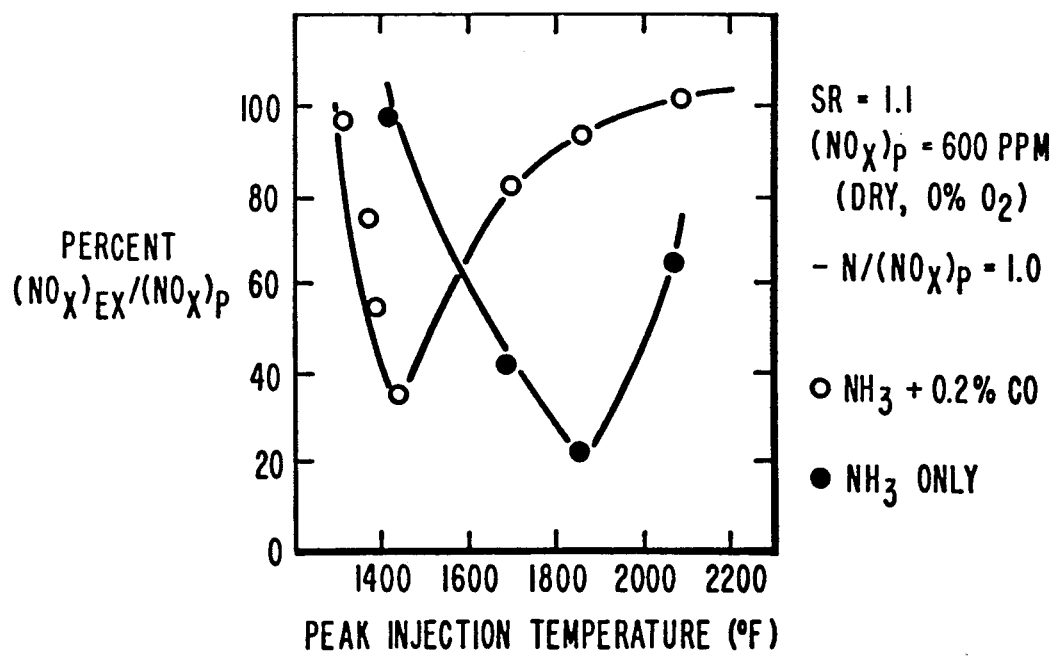
FIG. 6 graphically illustrates the conversion efficiency of $NH_3$ to $N_2$ in the burnout zone as a function of temperature.
Figure 7:
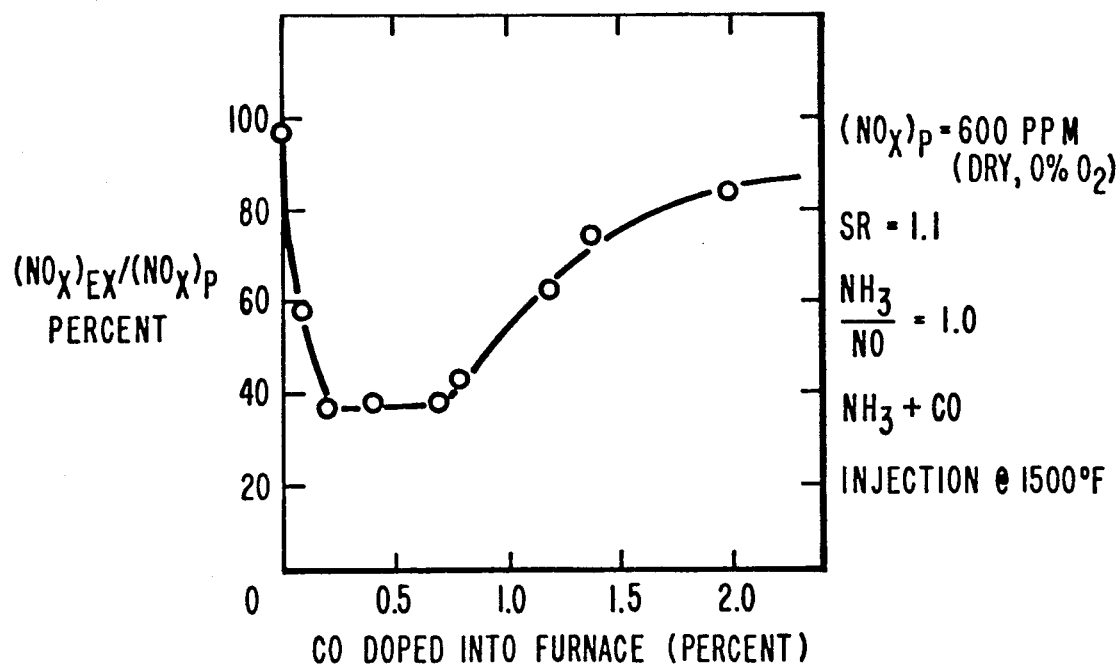
FIG. 7 illustrates reduction of $NO_x$ as a function of carbon monoxide concentration in the burnout zone.

FIG. 6 is an experimental examination of the burnout zone chemistry, in particular, the conversion efficiency of $NH_3$ to $N_2$. The fuel-rich zone was assumed to supply 600 ppm each of NO and $NH_3$ or an N to NO ratio of 1.0. Under excess air conditions, ammonia gas was mixed with various amounts of CO and injected at temperatures between 1800° F. and 2200° F. The solid symbols represent the injection of $NH_3$ alone, which is basically a simulation of Thermal De-$NO_X$. For the open symbols in FIG. 6, 0.2 percent CO was included with $NH_3$ thereby yielding a burnout-like environment. The presence of CO lowered the optimum temperature for $NO_X$ reduction from 1800° F. to 1500° F. It is readily apparent that a reduction in the burnout temperature from the 2200° F.-2400° F. normally employed would increase the conversion efficiency of $NH_3 + NO$ to $N_2$ because of the presence of CO. However, it was found that the conversion efficiency was also dependent upon the concentration of CO. As shown in FIG. 7, at the optimum reaction temperature of 1500.F, the optimum CO level was approximately 0.5 percent, or less, equivalent to a fuel-rich zone stoichiometry between 0.95 and 1.0.

Figure 8:
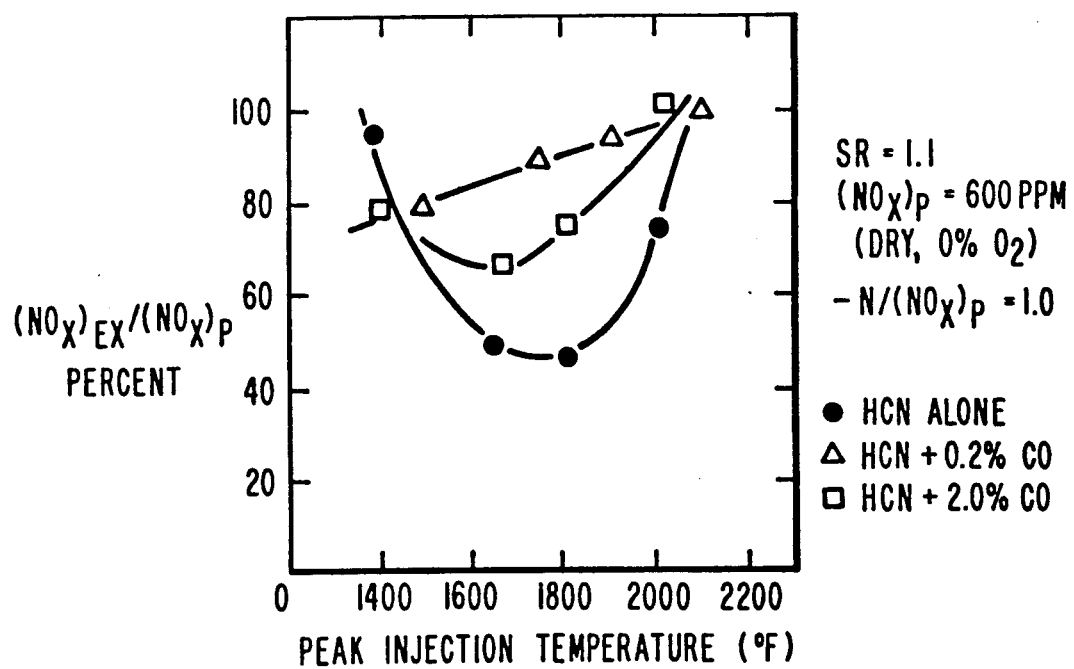
FIG. 8 illustrates the reduction of $NO_x$ as a function of temperature in the burnout zone for various HCN compositions.

FIG. 8 shows the corresponding results for HCN conversion. From FIGS. 8 and 6, the NO reductions obtained with HCN alone were not as high as those with $NH_3$. Also, the presence of CO lowered the reduction efficiency. Thus, an amine is a preferred reducing species for the burnout zone.

Figure 9:
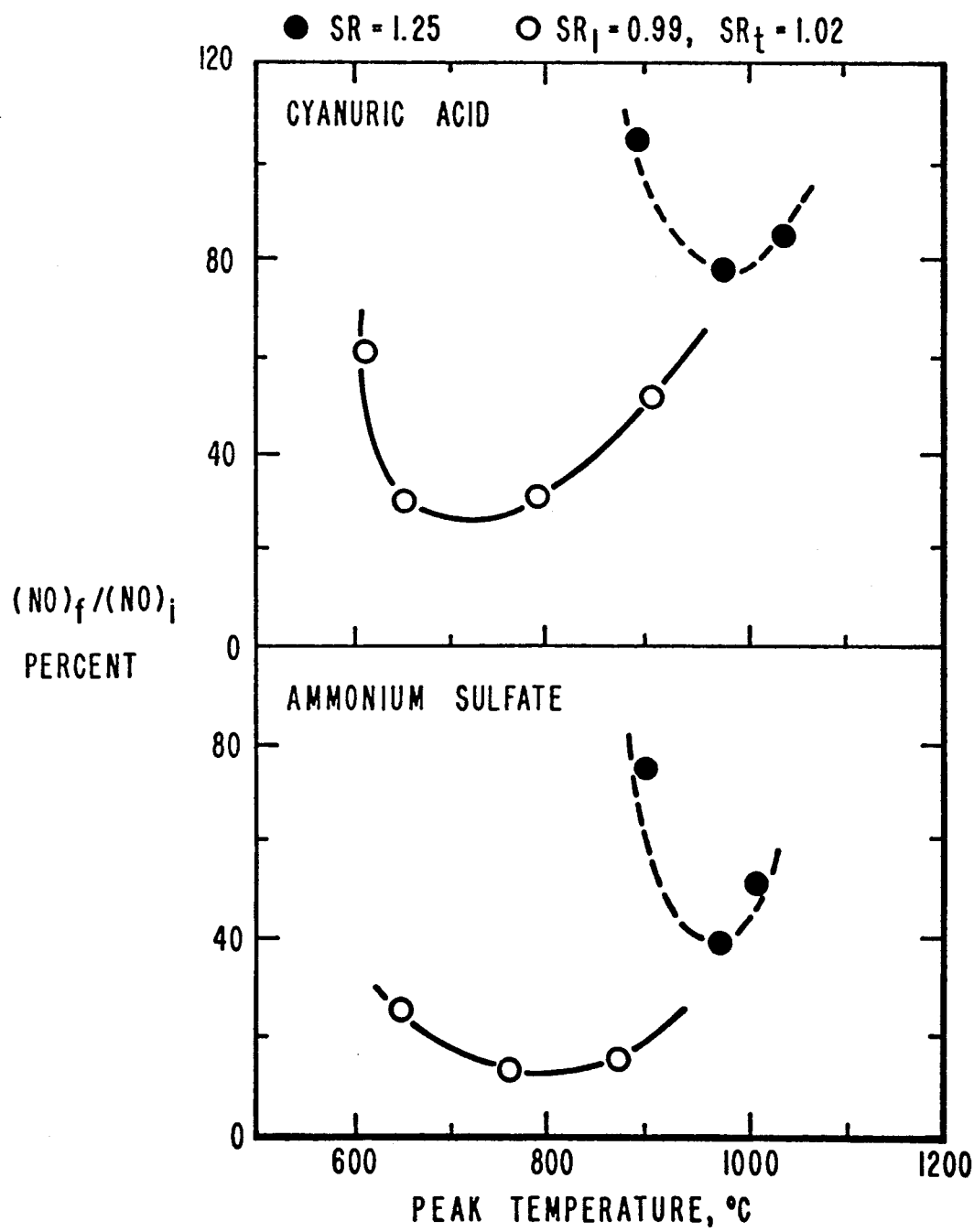
FIG. 9 compares NO reduction obtained when a reducing agent (results for cyanuric acid and ammonium sulfate are shown) is introduced under 25% excess air and introduced under slightly fuel-rich conditions.

FIG. 9 summarizes a series of experiments which were conducted in the tunnel furnace "B" with an initial NO concentration of 240 ppm and a —N to NO ratio of 1.5. The solid symbols and dotted lines show results for cyanuric acid or ammonium sulfate injection under classical "De-$NO_X$" conditions with 25percent excess air (SR = 1.25) and indicate an optimum reaction temperature of approximately 1000° C. as has been reported previously.

Somewhat surprisingly, however, significantly larger reductions can be achieved over a broader temperature range if the selective reducing agent is added under slightly fuelrich conditions (in this case $SR_1 = 0.99$), and the final burnout air is added subsequently downstream. The open symbols and solid lines represent these data, and for these tests the peak temperature refers to the temperature at which the final burnout air was added. The selective reducing agent was added into the fuel-rich zone at 900° C. Other compound such as ammonium sulfate, which are significantly less expensive and potentially less toxic, can produce even larger reductions than those measured with cyanuric acid.

Kinetic modeling suggests that the fuel-rich zone acts primarily as a source of CO. At the rich-lean transition, the CO is oxidized and excess OH is produced by the usual chain branching reactions described in equations (6)–(8) above. For low initial CO concentration the excess radicals are consumed by:

$$NH_3 + OH \rightarrow NH_2 + H_2O \tag{9}$$

The $NH_2$ is then available for reaction with NO to eventually yield $N_2$.

The above results suggest that the key parameters for the enhancement of burnout zone chemistry are:

(1) reaction temperature (1300° F. to 1900° F., preferably about 1400°-1700° F.)
(2) CO level (0.5 percent or less), and
(3) presence of $NH_3$ species.

Conventional reburning processes do not provide an optimum environment.

3. Advanced Reburning a. Bench Scale Studies

Figure 10:
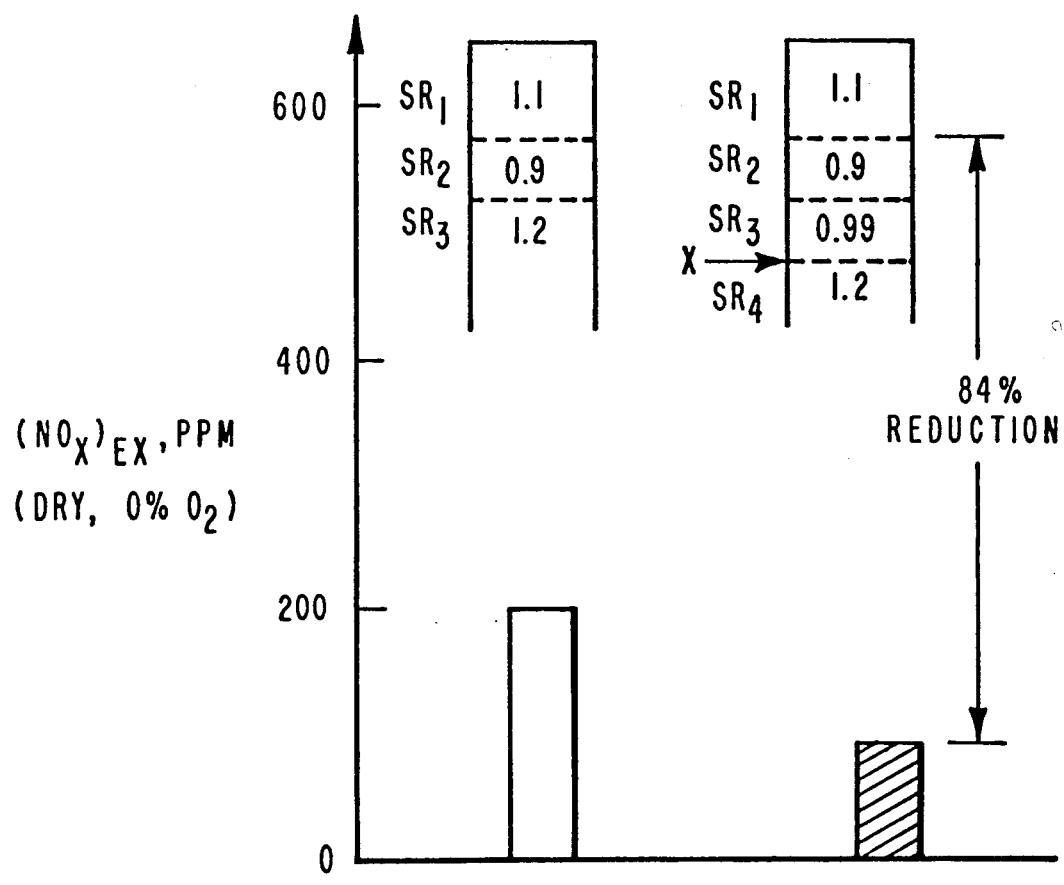
FIG. 10 illustrates the $NO_x$ reduction obtained when using an optimized reburning process of the present invention.

An optimized process was designed and tested, first using the bench scale furnaces described above and then using the pilot scale furnace described above. Results using furnace "A" described above are presented in FIG. 10. In these experiments, the burnout air was split into two streams. The first stream remained at the normal injection location to reduce the CO concentration from 2.5 percent to approximately 0.2 percent. The second stream was injected downstream at a lower temperature, i.e. 1500° F., to complete the burnout. Little improvement over the conventional process was obtained due to the lack of $NH_3$ species at an $SR_3$ of 0.99. However, when an aqueous ammonium sulfate solution was added with the second burnout air to provide the required $NH_3$ species, an additional 50 percent reduction was dramatically achieved, resulting in an overall reduction of 85 percent in $NO_X$ emissions.

Figure 11:
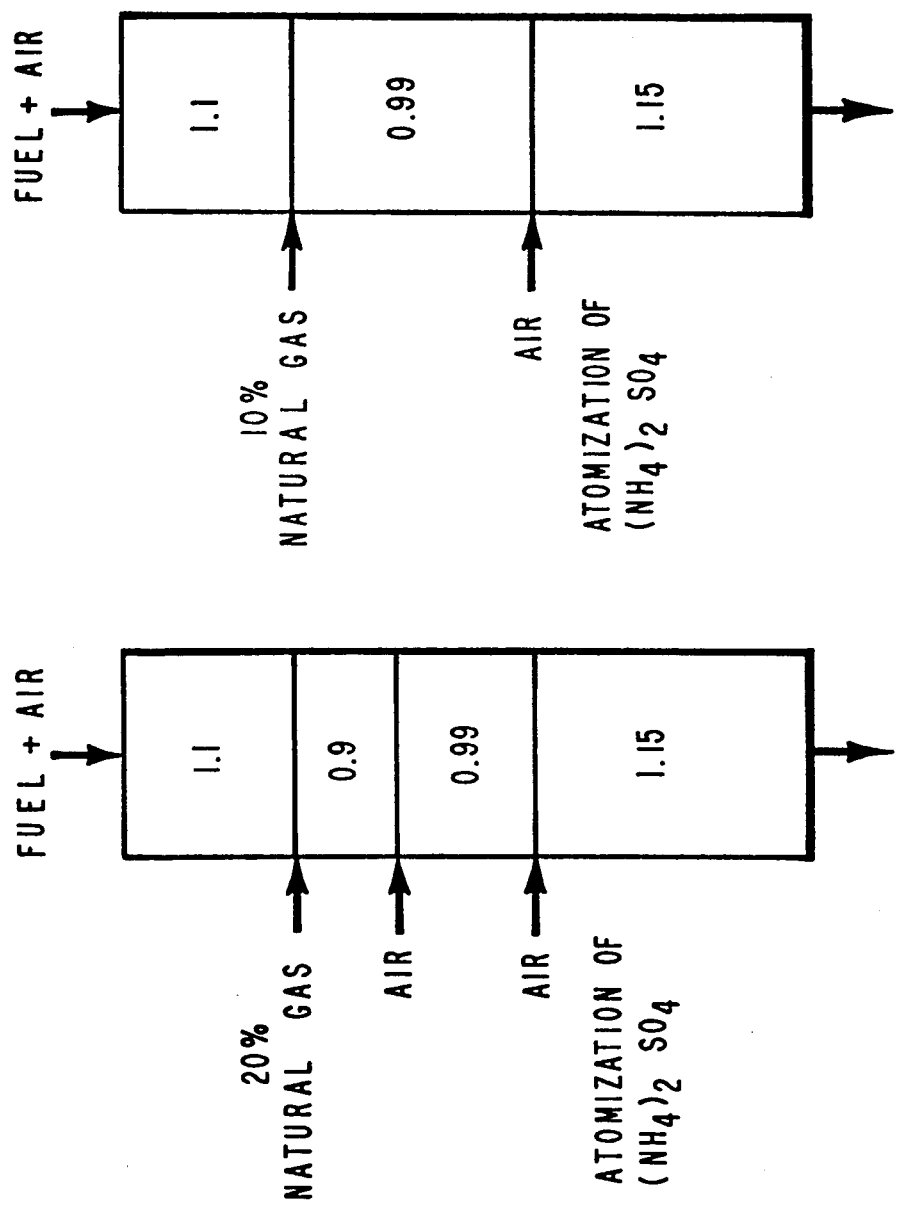
FIG. 11 is a representation of two hybrid reburning processes within the scope of the present invention at 10% and 20% gas reburning.

FIG. 11 shows two hybrid schemes with 20 percent and 10 percent gas reburning, respectively using furnace "B" described above. With 20 percent reburning ($SR_2 = 0.9$), the burnout air was divided into two streams to yield an $SR_3$ of 0.99 and an $SR_f$ of 1.15. With 10 percent reburning, the reburning zone stoichiometry (SR$_2$) was 0.99 and the burnout air stoichiometry (SR$_t$) was 1.15. In both cases, an aqueous solution of ammonium sulfate was atomized with the final burnout air and injected at 850° C. at an N to NO molar ratio of 1.5.

FIG. 1; also illustrates an additional embodiment to the present invention. This embodiment includes a system for reducing nitrogen oxides in combustion emissions comprising a means for mixing a reburning fuel with combustion emissions in a gaseous reburning zone such that the reburning zone is substantially oxygen deficient. The reburning zone has a carbon monoxide concentration below about 0.5 percent. Also, the embodiment includes a burnout zone in gaseous communication with the reburning zone such that gaseous emissions pass from the reburning zone into the burnout zone. The burnout zone has a temperature in the range from about 1300° F. to about 1900° F., and the burnout zone has means for introducing a stream of burnout air into the burnout zone. The stream of burnout air includes a reducing agent capable of providing a source of NH$_3$ species.

Figure 12:
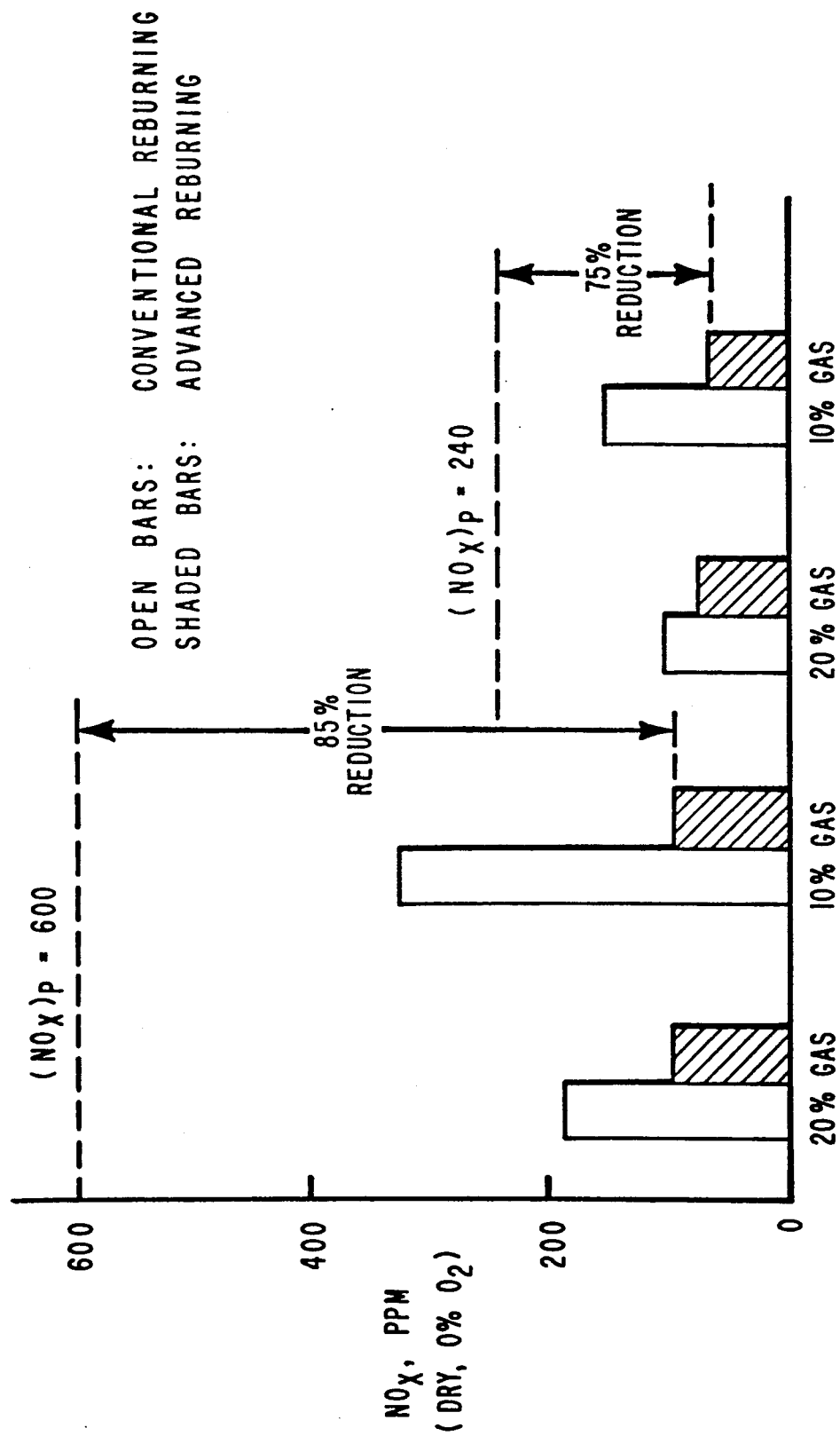
FIG. 12 shows $NO_x$ reduction obtained using the optimized reburning processes illustrated in FIG. 11 with natural gas as the primary fuel.

FIG. 12 presents the results obtained with natural gas as the primary fuel. The natural gas was doped with NO to provide two levels of primary NO$_X$ ("(NO$_X$)$_9$)", 600 ppm and 240 ppm (dry, 0 percent O$_2$). Twenty and ten percent reburning were applied separately in both cases. These data indicate that a hybrid process which utilizes 10 percent reburning fuel can achieve similar overall efficiency to a process using 20 percent reburning. It is apparent that there exists a tradeoff between natural gas premiums and the cost of ammonium sulfate.

b. Pilot Scale Verification

A series of experiments were first carried out with natural gas as the primary fuel to define optimum stoichiometry distribution for the advanced reburning process within the scope of the present invention at pilot scale. Measurements of CO and O$_2$ concentrations were conducted at the ammonium sulfate injection location, approximately at 900° C. Results obtained suggest that in order to have an optimum CO level between 1500 and 2000 ppm (corresponding to approximately 0.7 percent O$_2$) at the reagent injection location, it was necessary to increase the local stoichiometry from 0.99, as defined in the bench scale studies, to 1.03 to account for the finite rate mixing and higher CO concentrations in the pilot scale furnace.

Figure 13:
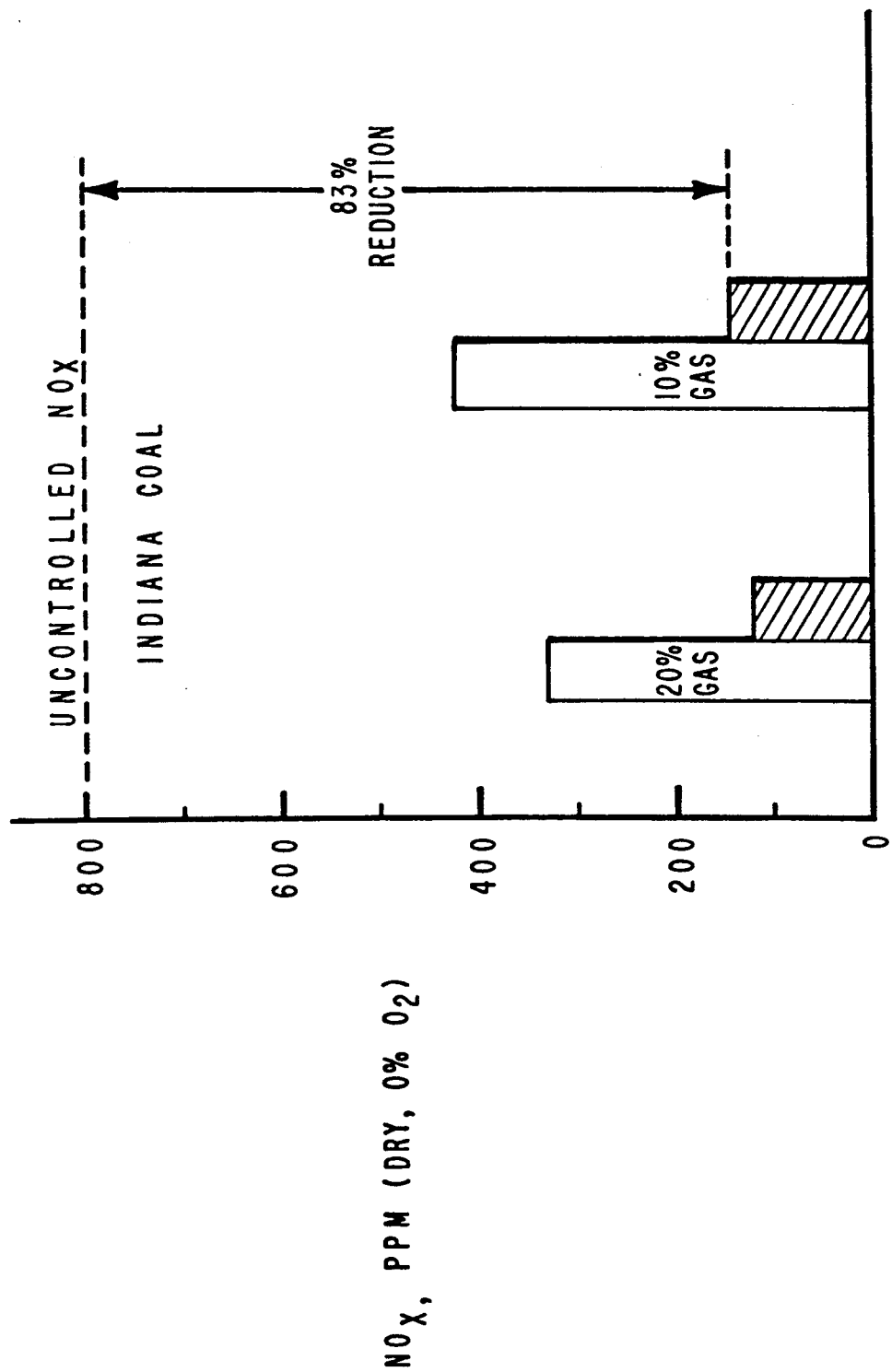
FIG. 13 shows $NO_x$ reduction obtained using the optimized reburning processes illustrated in FIG. 11 with Indiana coal as the primary fuel.

Experiments were subsequently carried out with an Indiana coal as the primary fuel. The Indiana coal produced an uncontrolled NO$_X$ emission of 800 ppm (dry, 0 percent O$_2$) at 15 percent excess air. The primary NO$_X$ at SR$_1$=1.13 was 680 ppm. FIG. 13 represents the results and indicate that as seen in the bench scale studies, both advanced concepts were equally effective in NO$_X$ reductions. Similar results were also obtained with a Utah coal as the primary fuel (primary NO$_x$=850 ppm, FIG. 14).

Figure 14:
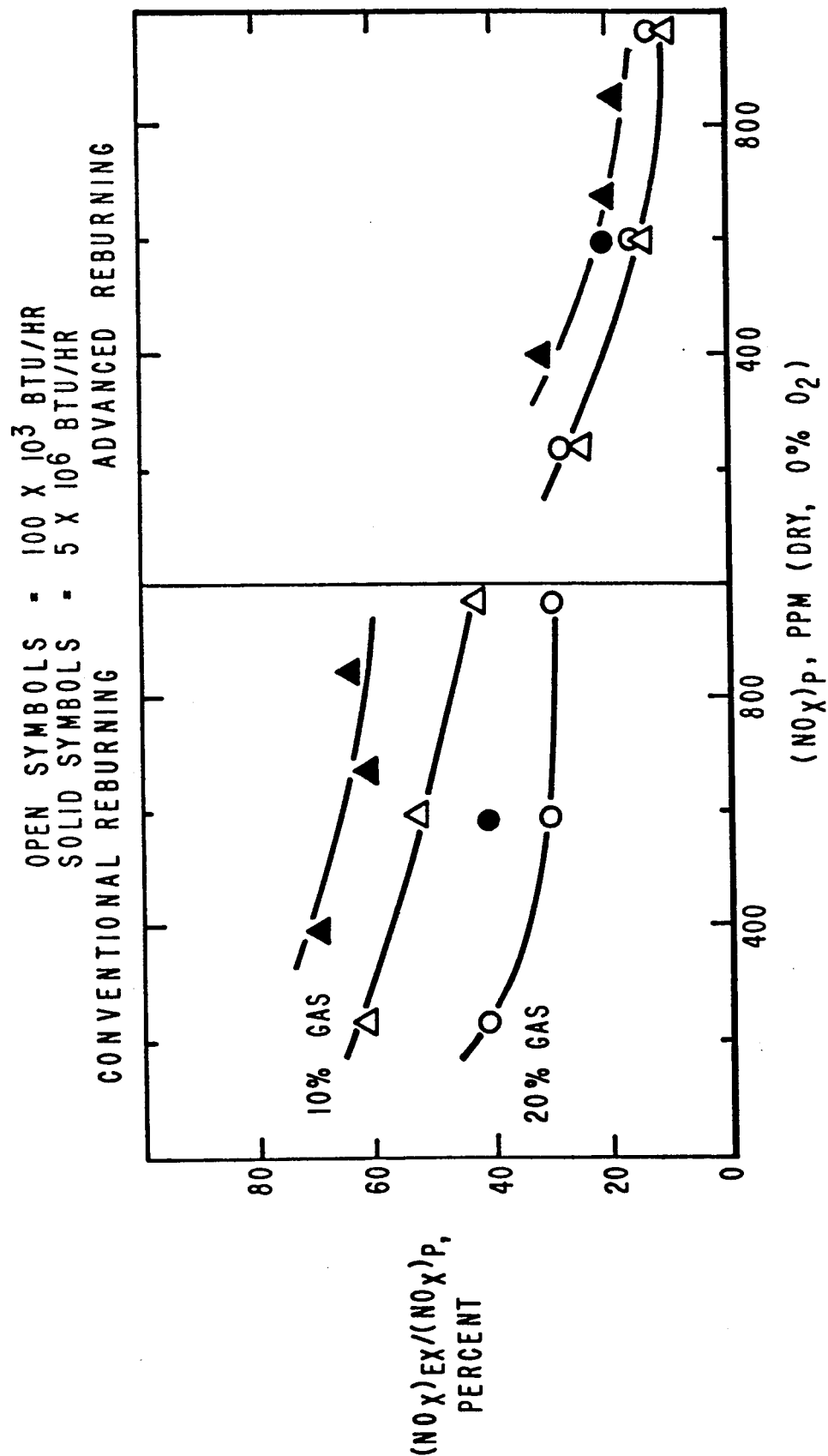
FIG. 14 provides a graphical summary of all of the pilot scale results and compares them with the bench scale data for $NO_x$ reduction using the optimized reburning processes of the present invention.

FIG. 14 summarizes all of the pilot scale results and compares them with the bench scale data. The ratios of (NO$_X$)$_{EX}$ to (NO$_X$)$_P$ are presented as a function of (NO$_X$)$_P$ concentrations. It can been seen that for both conventional reburning and advanced reburning, the process efficiency depends on the (NO$_X$)$_P$ level, higher efficiencies are obtained at higher (NO$_X$)$_P$. Also, substantial scale effects were observed with conventional reburning. However, with advanced reburning the effect of scale was much less significant. Approximately 7 percent loss in process efficiency was observed when scaled up from $100 \times 10^3$ Btu/hr to $5 \times 10^6$ Btu/hr, a factor of 50 times.

c. By-Product Emissions

The injection of ammonium sulfate into the furnace has a potential of producing unwanted emissions such as NH$_3$ and SO$_2$/SO$_3$. A series of exhaust measurements were made to evaluate the slip of ammonia using selective ion electrode and the missions of SO$_2$ and SO$_3$ via controlled condensation. Table 1 summarizes measurements made during the Indiana coal tests. Exhaust NH$_3$ concentrations were negligible in all cases, including those obtained with Utah coal and natural gas as the primary fuel. Higher SO$_2$ emissions were obtained with 10 percent gas reburning. However, the uncontrolled SO$_2$ level was maintained with 20 percent gas reburning due to dilution. No increase in SO$_3$ emissions was observed for both cases, suggesting favorable conversion of the sulfate to SO$_2$.

TABLE 1

| By-Product Emissions With Indiana Coal | | | |
|---|---|---|---|
| Condition | NH$_3$ ppm | SO$_2$ ppm | SO$_3$ ppm |
| Uncontrolled | 0 | 1380 | 10 |
| 10% Gas Reburning | <2 | 1500 | 13 |
| 20% Gas Reburning | <2 | 1400 | 9 |

To prevent an increase in SO$_2$ emissions due to the injection of ammonium sulfate, it is recommended that 10 percent gas reburning within the scope of the present invention be used for high sulfur coals and 20 percentages reburning be used for low sulfur coal applications.

CONCLUSION

In summary, the experimental results described above suggest that selective reducing agents can be combined with combustion modification techniques to provide NO$_X$ reductions that are larger than those that are possible by applying the technologies simultaneously but separately. By controlling the stoichiometry associated with reburning to produce a slightly fuel-rich region for selective reducing agent injection, reductions can be achieved at relatively low temperatures without the use of stainless steel or other catalysts. In principle, this technology could have broad application to fossil fuel fired furnaces and boilers, stationary gas turbines, and internal combustion engines.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. patent is:

1. A process for reducing nitrogen oxides in combustion emission systems comprising the steps of:
   (a) mixing a reburning fuel with combustion emissions in a gaseous reburning zone such that the reburning zone is substantially oxygen deficient;
   (b) passing the resulting mixture of reburning fuel and combustion emissions into a first burnout zone;
   (c) introducing a first stream of burnout air into the first burnout zone such that the carbon monoxide concentration in the first burnout zone is reduced to a level below about 0.5 percent;

(d) advancing the resulting mixture from the first burnout zone to a second burnout zone having a temperature in the range from about 1300° F. to about 1900° F.; and (e) introducing a second stream of burnout air into the second burnout zone, said second stream of burnout air including a reducing agent capable of providing a source of nitrogenous reducing species thereby reducing the nitrogen oxides in the combustion emissions.

2. A process for reducing nitrogen oxides in combustion emission system as defined in claim 1, wherein the substantially oxygen deficient reburning zone has a stoichiometry in the range from about 0.7 to about 1.0.

3. A process for reducing nitrogen oxides in combustion emission systems as defined in claim 1, wherein the reburning zone has a temperature in the range from about 2200° F. to about 3000° F.

4. A process for reducing nitrogen oxides in combustion emission systems as defined in claim 1, wherein the reburning fuel mixed with the combustion emissions includes natural gas.

5. A process for reducing nitrogen oxides in combustion emission systems as defined in claim 1, wherein the first burnout zone has a stoichiometry in the range from about 1.0 to about 1.2.

6. A process for reducing nitrogen oxides in combustion emission systems as defined in claim 1, wherein the first burnout zone has a temperature in the range from about 1300° F. to about 3000° F.

7. A process for reducing nitrogen oxides in combustion emission systems as defined in claim 1, wherein the first burnout zone has a temperature in the range from about 1300° F. to about 2600° F.

8. A process for reducing nitrogen oxides in combustion emission systems as defined in claim 1, wherein the carbon monoxide concentration in the first burnout zone is reduced to a level below about 0.5 percent.

9. A process for reducing nitrogen oxides in combustion emission systems as defined in claim 1, wherein the second burnout zone has a stoichiometry in the range from about 1.0 to about 2.0.

10. A process for reducing nitrogen oxides in combustion emission systems as defined in claim 1, wherein the second burnout zone has a temperature in the range from about 300° F. to about 1900° F.

11. A process for reducing nitrogen oxides in combustion emission systems as defined in claim 1, wherein the reducing agent included with the second stream of burnout air includes ammonium sulfate.

12. A process for reducing nitrogen oxides in combustion emission systems as defined in claim 1, wherein the reducing agent included with the second stream of burnout air includes cyanuric acid.

13. A process for reducing nitrogen oxides in combustion emission systems as defined in claim 1, wherein the reducing agent included with the second stream of burnout air includes urea.

14. A process for reducing nitrogen oxides in combustion emission systems as defined in claim 1, wherein the reducing agent included with the second stream of burnout air includes ammonia gas.

15. A process for reducing nitrogen oxides in combustion emission systems as defined in claim 1, wherein the reducing agent included with the second stream of burnout air includes aqueous ammonium solution.

16. A process for reducing nitrogen oxides in combustion emission systems as defined in claim 1, wherein the reducing agent is aqueous ammonium sulfate solution.

17. A process for reducing nitrogen oxides in combustion emission systems as defined in claim 1, wherein the reducing agent is cyanuric acid.

18. A process for reducing nitrogen oxides in combustion emission systems as defined in claim 1, wherein the reducing agent is urea.

19. A process for reducing nitrogen oxides in combustion emission systems as defined in claim 1, wherein the reducing agent is ammonia gas.

20. A process for reducing nitrogen oxides in combustion emission systems as defined in claim 1, wherein the reducing agent is aqueous ammonium solution.

21. A process for reducing nitrogen oxides in combustion emission systems as defined in claim 1, wherein the reducing agent is ammonium formate.

22. A process for reducing nitrogen oxides in combustion emission systems as defined in claim 1, wherein the reducing agent is aqueous ammonium formate.

23. A process for reducing nitrogen oxides in combustion emission systems as defined in claim 1, wherein the reducing agent is ammonium carbonate.

24. A process for reducing nitrogen oxides in combustion emission systems as defined in claim 1, wherein the reducing agent is aqueous ammonium carbonate.

25. A process for reducing nitrogen oxides in combustion emission systems as defined in claim 1, wherein the reducing agent is ammonium bicarbonate.

26. A process for reducing nitrogen oxides in combustion emission systems as defined in claim 1, wherein the reducing agent is aqueous ammonium bicarbonate.

27. A process for reducing nitrogen oxides in combustion emission systems as defined in claim 1, wherein the reducing agent is ammonium sulfate.

28. A process for reducing nitrogen oxides in combustion emission systems as defined in claim 1, wherein the reducing agent is aqueous ammonium sulfate.

* * * * *

UNITED STATES PATENT AND TRADEMARK OFFICE
CERTIFICATE OF CORRECTION

PATENT NO. : 5,139,755
DATED : August 18, 1992
INVENTOR(S) : WILLIAM R. SEEKER et al.

It is certified that error appears in the above-identified patent and that said Letters Patent is hereby corrected as shown below:

```
Column 2, line 29, delete first occurrence of "below"
Column 4, line 36, "225.C/second" should be --225°second--
Column 8, line 6, "25percent" should be --25 percent--
Column 8, line 19, "compound" should be --compounds--
Column 9, line 5, "FIG. 1;" should be --FIG. 11--
Column 10, line 9, "missions" should be --emissions--
Column 10, lines 32-33, "20 percent-ages" should be
--20 percent gas--
```

Signed and Sealed this

Sixteenth Day of November, 1993

Attest:

BRUCE LEHMAN

Attesting Officer

Commissioner of Patents and Trademarks